April 26, 1966    R. B. MERIPOL    3,248,135

SEALED SLIP JOINT COUPLING

Filed May 27, 1963

INVENTOR.
ROBERT B. MERIPOL

BY
*Head & Johnson*
ATTORNEYS

United States Patent Office 3,248,135
Patented Apr. 26, 1966

3,248,135
SEALED SLIP JOINT COUPLING
Robert B. Meripol, Fort Worth, Tex., assignor to Liberty Manufacturing Company of Texas, Fort Worth, Tex., a corporation of Texas
Filed May 27, 1963, Ser. No. 283,222
6 Claims. (Cl. 285—323)

This invention relates to an improved sealed slip joint coupling. More particularly this invention relates to improved pipe couplings of the slip joint type having improved sealing means.

There are many well-known methods in the art for the coupling together of adjacent pipe sections such as, for instance, screw threading one end of a pipe section into the adjacent end of another pipe section, threadably attaching adjacent ends of pipe sections together by means of a union-type connector, and connecting adjacent ends of pipe sections together by welding.

These various pipe connecting methods have numerous disadvantages including the extensive operational time requirements, difficulty of operations, absence of efficient sealing means resulting in leakage, and, in the case of welded pipe joints, the permanent character of the coupling.

It is therefore an object of this invention to provide an improved sealed slip joint coupling for pipe sections which overcomes the disadvantages of the known pipe coupling means.

It is another object of this invention to provide an improved pipe coupling that is quick acting, simple to install, and leak proof.

Another object of this invention is to provide a quick acting pipe coupling device including a slip cage for threaded attachment with one end of a pipe section with the slips gripping the end portion of an adjacent section of pipe to connect the two sections together.

Another object of this invention is to provide a quick acting pipe coupling device of the slip joint type including an improved sealing means for sealing the coupling against leakage.

Another object of this invention is to provide an improved quick acting pipe coupling device utilizing wedge-shaped slips to couple the pipe sections together and improved seals to seal off the connection.

Another object of this invention is to provide a quick acting pipe coupling device of the slip joint type for coupling pipe sections together including a slip cage for threaded attachment at one end of a pipe section with the slips gripping the end portion of the adjacent section of pipe thereby coupling the sections together with fabric seals contained within the coupling device to prevent leakage thereacross.

Another object of this invention is to provide an improved pipe coupling device of the slip joint type wherein improved sealing means are made integrally with the segmented self-aligning slips to seal the connection and prevent leakage thereacross.

Another object of this invention is to provide an improved pipe coupling device of the type described which is provided with a combination of a metal to metal seal and one or more fabric seals to prevent leakage across the coupling.

Another object of this invention is to provide an improved pipe coupling device of the slip joint type including a metal to metal positive drive between one end of one of the pipe sections and the slip segments to insure positive slip action and hold the segments positively in position.

Another object of this invention is to provide an improved pipe coupling device of the type described in which is provided a resilient sealing member which also serves as a relieving member to urge the slip segments out of gripping engagement with the end portion of one of the pipe sections.

Further objects and advantages of this invention will be apparent from the following description and appended claims, reference being had to the accompanying drawings forming a part of this specification wherein like reference characters represent corresponding parts in the several views.

In general the sealed slip joint coupling of this invention consists of a substantially cylindrical shaped slip cage threadably attached to the enlarged end portion of a first pipe section and containing therein one or more segmented wedge-shaped slips, the slips being in gripping contact with the external surface of the end portion of a second pipe section telescoped within the end portion of the first pipe section. Located on one end surface of the segmented slips is an annular shaped lip for contacting the end surface of the first pipe section in a metal to metal positive drive relation to insure positive slip action and to hold the slip segments in position. Located both internally and externally of this annular lip are circular sealing members of a resilient type material. Located on the opposite end of the segmented slips is an annular sealing element of resilient material which also serves as a relieving member to the slips out of engagement with the second pipe section. The pipe sections are connected or coupled together by the action of the segmented slips with the coupling being sealed by the combination of a metal to metal seal and triple resilient seals.

*Specific description*

Figure 1:
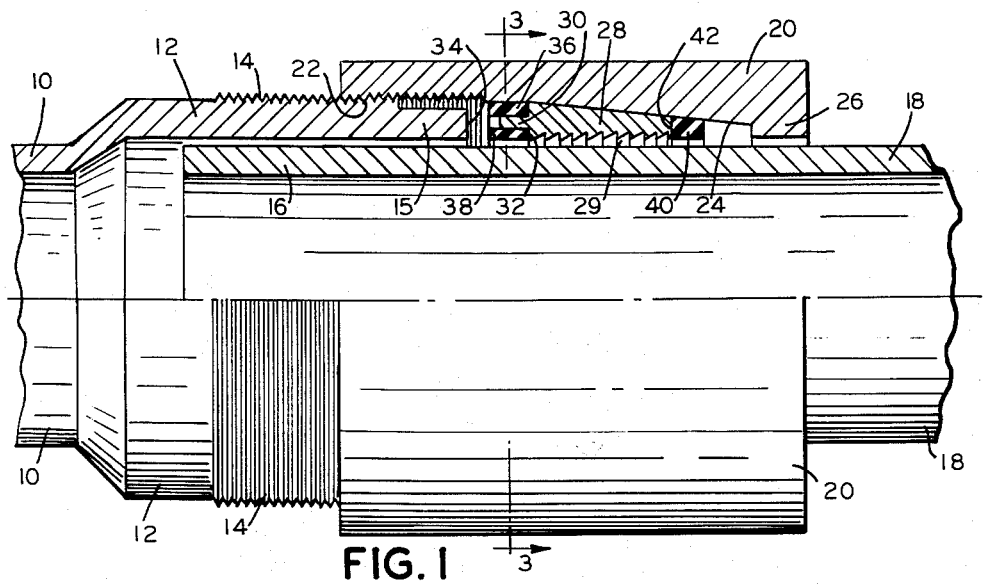
FIGURE 1 is a partial cross-sectional elevational view of the sealed slip joint coupling of this invention before the coupling has been made up.
Figure 2:
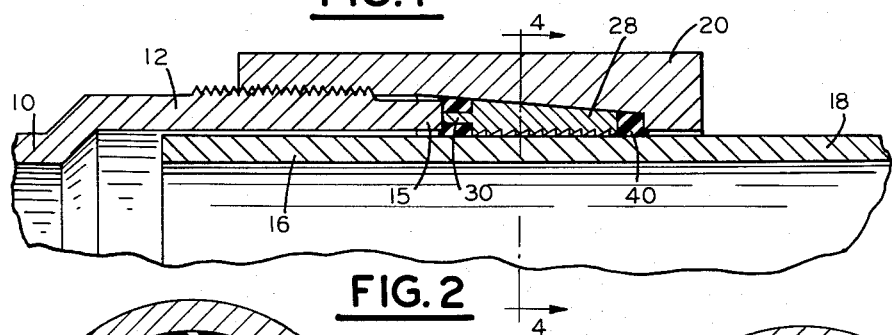
FIGURE 2 is a partial cross-sectional view of the sealed slip joint coupling of this invention with the slips in set position after the coupling has been made up.
Figure 3:
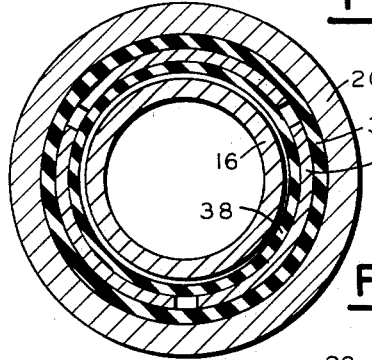
FIGURE 3 is a cross-sectional view taken along line 3—3 of FIGURE 1.
Figure 4:
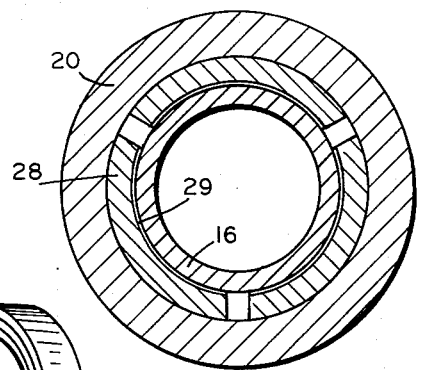
FIGURE 4 is a cross-sectional view taken along line 4—4 of FIGURE 1.

For a specific description of this invention, reference is made to the drawings in general and particularly to FIGURES 1 and 2. First pipe section 10 is provided with a diametrically enlarged end portion 12. End portion 12 is provided with external threads 14 and terminates in an open ended reduced external diameter tubular mandrel 15. End portion 12 is of a sufficiently large internal diameter to allow telescoping of the end portion 16 of a second pipe section 18, of the same diameter as first pipe section 10, therewithin.

Substantially cylindrical shaped slip cage 20 is provided internally of one end portion with threads 22 corresponding to the threads 14 on the end portion 12 of first pipe section 10. The other end portion of slip cage 20 is provided with a substantially frusto-conical internal configuration with the diameter of the cone decreasing in a direction away from the threads 22. Therefore, an annular inclined plane 24 is provided on the interior of the slip cage with the cone terminating in an inwardly directed annular flange portion 26.

Movably located within the internally conical shaped portion of the slip cage is a plurality of segmented self-aligning slips 28. The effective configuration of the external surface of these slips 28 is frusto-conical corresponding to the internal configuration of the slip cage 20. The internal surface of the slips is provided with a plurality of annular wedge-shaped teeth 29 for gripping engagement with the end portion 16 of second pipe section 18 to prevent withdrawal of that pipe section from telescoping relation with the end portion 12 when the coupling is made up.

As is shown in FIGURE 1 slip cage 20 is backed off from end portion 12 to allow the slips 28 to ride upwardly on the inclined plane 24 out of gripping engagement with pipe section 18. In that position pipe section 18 may be freely moved axially into or out of telescoping relation with end portion 12 of pipe section 10.

An annular axially extending lip 30 is provided on the end surface 32 of each slip segment 28, adjacent the end surface 34 of end portion 12. A first circular sealing element 36 is provided externally and adjacent to annular lip 30 between the lip 30 and the interior surface of the slip cage. A second circular sealing element 38 is located internally and adjacent to annular lip 30, between lip 30 and the exterior surface of pipe section 18. The purpose of lip 30 and first and second circular sealing elements 36 and 38, respectively, will be further described hereinafter.

Annular sealing element 40 is located adjacent the end surface 42 of the segmented slips 38, between the interior surface of slip cage 20 and the exterior surface of second pipe section 18.

First and second circular sealing elements 36 and 38, respectively, and annular sealing element 40 are preferably made of a resilient material such as Teflon, rubber or fabric reinforced rubber, or similar material. It should be also understood that these elements can be placed separately and independently within the slip cage 20 or, alternatively, they may be, and preferably are, molded directly to the segmented slips 28. When molded directly to the slips 28, these elements will cooperate to retain the slips in properly oriented position within the slip cage 20.

Alhough it is described as being preferred that at least three segmented slips 28 be used in this coupling, this is not to be considered as a limiting restriction as it is contemplated that any number of slips can be used without departing from the spirit and scope of this invention.

*Operation*

In the operation of this invention slip cage 20, with slips 28 and sealing elements 36, 38 and 40 positioned therein, is threadably attached to the end portion 12 of first pipe section 10. However, the slip cage is not advanced upon end portion 12 sufficiently to bring the end surface 34 of end portion 12 into contact with the first and second circular sealing elements 36 and 38, respectively, and the lip 30 of the slips 28. Therefore, the slips 28 are in their maximum extended position within slip cage 20. The end portion 16 of second pipe section 18 is then telescopically positioned internally of end portion 12.

It should be noted that it is imperative to the operation of this coupling device that end portion 16 be advanced sufficiently far within end portion 12 that slips 28 will engage end portion 16 when they are moved inwardly in a manner to be further described hereinafter.

With end portion 16 positioned within end portion 12 slip cage 20 is fully advanced upon end portion 12. As slip cage 20 is advanced upon end portion 12 first and second sealing elements 36 and 38, respectively, will be brought into contact with the end surface 34 of end portion 12. Further advancement of slip cage 20 upon end portion 12 forces the slips 28 and the associated sealing elements 36, 38 and 40 rearwardly of the slip cage 20. Continued rearward movement of slips 28 along the inclined annular surface 24 of slip cage 20 results in a gradual reduction of the effective diameter of the slips 28 and their associated sealing elements 34, 36 and 40 thereby urging the slips inwardly into gripping contact with the exterior surface of end portion 16.

Slip cage 20 is advanced upon end portion 12 until lip 30 contacts the end surface 34 of end portion 12 and annular sealing element 40 contacts flange 26 of slip cage 20 and is extruded into sealing contact with the exterior surface of the pipe section 18. Flange 26 both limits the rearward movement of slips 28 and sealing elements 36, 38 and 40 and prevents excessive extrusion of element 40 when the coupling is made up.

It should be understood that lip 30 provides an unyielding metal to metal positive drive between the end surface 34 of mandrel 15 and the slip segments 28 to insure positive slip action and to hold the slips positively in position. Therefore a relatively large constant setting force is applied to the slips to provide a strong unyielding connection between the two pipe sections 10 and 18. It should further be noted that lip 30 also serves as a reinforcing member of the sealing elements 36 and 38 and assists in maintaining these elements in their properly oriented positions within the slip cage 20.

With the slip cage in this position pipe sections 10 and 18 are effectively locked together by the gripping action of slips 28. Also, the coupling is efficiently sealed by the extrusion of sealing elements 36, 38 and 40 into sealing contact with the surfaces surrounding them. The axial length of lip 30 is made somewhat shorter than the corresponding length of sealing elements 36 and 38 to insure that they will be extruded when the coupling is fully made up.

When it is desired to break this connection and separate the two pipe sections, slip cage 20 is simply backed off from end portion 12 thereby allowing the slips 28 to ride outwardly on the inclined surface 24, out of engagement with the pipe section 18. Slips 28 will be urged into their outwardly expanded position by the elastic expansion of the contracted sealing element 40. Pipe section 18 is then easily removed from telescoping relation within portion 12 of pipe section 10.

As was noted above, the extreme end of end portion 12 is reduced in external diameter to provide a smooth surfaced tubular mandrel 15. The purpose of this mandrel is to extend beyond the threaded portion of the slip cage 20 into contact with the sealing elements 36 and 38 and the lip 30. This allows the design of the coupling such that sealing element 36 is never in contact with threads 22 on slip cage 20, even when the slips are fully open. Therefore element 36 will not be "chewed up" by continued contact with the threads of the coupling and will have a longer operating life.

Figures 5, 6:
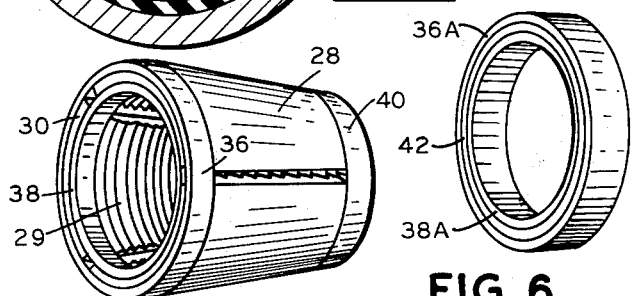
FIGURE 5 is an external elevational view of the segmented slips and sealing elements of this invention.
FIGURE 6 is an external elevational view of an alternate embodiment of the sealing elements of this invention.

In the alternate embodiment of the sealing elements of this invention shown in FIGURE 6, resilient sealing elements 36A and 38A are the same as elements 36 and 38, respectively, described above. However, lip extension 30 has been replaced by a continuous circular metallic ring 42. Ring 42, like lip 30, reinforces sealing elements 36A and 38A and provides a metal to metal positive drive between end surface 34 of mandrel 15 and the segmented slips 28. Ring 42 also serves the important function of providing a metal to metal seal with the surface 34 when the coupling is made up to assist in sealing the coupling to prevent leakage thereacross.

Of course, ring 42 is separate from the segmented slips 28 since ring 42 will not vary in diameter between the set and released position of the slips. Also, ring 42 can be placed independently between the sealing elements 36A and 38A within the slip cage 20 or, alternatively, the elements can be molded to the ring.

It should be noted that although the operation of this invention has been described as contemplating the attachment of slip cage 20 to end portion 12 prior to the insertion of end portion 16 into end portion 12, it is contemplated that slip cage 20 can be telescoped about pipe section 18 and then end portion 16 telescoped within end portion 12 and the joint made up as above described.

It should be also noted that the sealed slip joint coupling of this invention is not limited to the coupling together of pipe sections of the same diameter but may be used in coupling together pipe sections of substantially different diameters. This is made possible by proper selection of the relative sizes of the slip cage 20, slips 28 and sealing elements 34, 36 and 40.

Furthermore, although slip cage 20 is shown as having a circular exterior configuration, it is contemplated that slip cage 20 can have any convenient configuration such as square, circular or hexagonal, according to the preference of the manufacturer and user.

It must be understood that although end portion 12 is described as an enlarged end portion of one of the pipe sections to be connected together, it is contemplated that this may be a separate portion of the coupling of this invention, intended to be threaded onto the conventional end (that is, not externally upset) of a pipe section.

This invention provides a quick acting, easily operable, relatively maintenance free slip joint coupling of the non-permanent type. Furthermore, this invention provides a highly efficient sealing means for sealing the slip joint coupling to prevent leakage thereacross. The slip joint coupling as described is highly compact, of rugged construction and efficiently seals against the passage of fluid into or out of the pipe section, across the coupling.

The invention has been described by reference to specific and preferred embodiments. It will be apparent, however, that many modifications can be made without departing from the spirit and scope of the invention. Accordingly, this invention should be construed not to be limited to the embodiments herein described but should be limited only by the scope of the appended claims.

What is claimed is:

1. A sealed slip joint coupling for coupling adjacent end portions of a first and a second tubular section wherein the end portion of said second tubular section telescopes within the end portion of said first tubular section comprising:
    an annular slip cage having a first end portion and a second end portion, said first end portion provided with internal threads for connection to corresponding external threads on the end portion of said first tubular section and said second end portion provided with a substantially frustoconical internal configuration, the diameter of said configuration decreasing in a direction away from said first end portion and terminating in an inwardly directed annular flange;
    a plurality of self aligning expansible annular slip sections positioned within said second end portion of said slip cage, and said slip sections when assembled having an external configuration corresponding to said internal configuration of said second end portion of said slip cage, each of said slip sections having a plurality of radially inwardly directed teeth, said slip sections being movable from a first expanded position to a second retracted position in gripping contact with the exterior of the second tubular section in response to threaded axial advancement of said slip cage upon the end portion of said first tubular section;
    an axially extending metallic positive drive member located between the end surface of said first tubular section and the end surface of said slip sections adjacent said first tubular section;
    a circular resilient sealing element positioned between the outer surface of said positive drive member and the adjacent inner surface of said slip cage; and
    a circular resilient sealing element positioned between the inner surface of said positive drive member and the adjacent outer surface of the end portion of said second tubular section.

2. A sealed slip joint coupling according to claim 1, wherein an annular resilient sealing element is positioned within said retainer member between the radial end of said slip sections and said inwardly directed annular flange, the internal surface of said retainer means, the external surface of said second tubular section and said inwardly directed annular flange, said first and second circular sealing elements and said annular sealing element cooperating to seal said coupling against leakage thereacross.

3. A sealed slip joint coupling according to claim 2, wherein said first and second circular sealing elements and said annular sealing element are bonded to said slip sections.

4. A sealed slip joint coupling according to claim 1, wherein said end portion of said first pipe section is provided at its open end with an externally reduced axially extending tubular mandrel portion extending into said second end portion of said slip cage into contact with said positive drive member and said first and second circular sealing elements when said coupling is made up.

5. A sealed slip joint coupling according to claim 1, wherein said positive drive member consists of an axially extending lip provided on each of said slip sections.

6. A sealed slip joint according to claim 1, wherein said positive drive member consists of an annularly continuous circular ring for contacting the end surface of the end portion of said first tubular section in a metal to metal seal.

References Cited by the Examiner

UNITED STATES PATENTS

| 1,304,126 | 5/1919 | Venable | 285—343 X |
| 2,047,569 | 7/1936 | Loomis | 285—105 |
| 2,283,975 | 5/1942 | Dillion | 285—104 |
| 2,452,277 | 10/1948 | Woodling | 285—382.7 X |
| 2,465,972 | 3/1949 | Stephens | 285—382.7 X |
| 2,585,453 | 2/1952 | Gallagher | 285—354 X |
| 2,691,418 | 10/1954 | Connolly | 285—105 X |
| 2,909,376 | 10/1959 | Drew | 285—342 X |
| 3,127,198 | 3/1964 | Orund | 285—146 |

FOREIGN PATENTS

| 379,413 | 9/1932 | Great Britain. |

CARL W. TOMLIN, *Primary Examiner.*